Patented May 1, 1945

2,374,995

UNITED STATES PATENT OFFICE 2,374,995

GOLD BASE BRAZING SOLDER

Franz R. Hensel, Indianapolis, Ind., assignor to P. R. Mallory & Co., Inc., Indianapolis, Ind., a corporation of Delaware No Drawing. Application August 4, 1942. Serial No. 453,524

2 Claims. (Cl. 75—165)

This invention relates to gold base brazing alloys suitable for brazing together metal parts.

An object of the invention is to improve brazing alloys.

Other objects of the invention will be apparent from the description and claims.

It is often desirable to use a brazing solder having high strength but relatively low melting point, preferably lower than that of most commercial silver solders. For example, most heat treated steels are quenched and then tempered at a temperature in the neighborhood of 1000° F. and it is necessary in joining parts formed of these steels that the tempering temperature be not exceeded. Otherwise, the physical properties of the steel may be materially impaired.

The present invention contemplates a gold base brazing solder having a melting point in the neighborhood of 1000° to 1100° F. and capable of bonding steels and other metals with a strong bond.

It is contemplated that the gold brazing alloy may contain the following ingredients in the proportions given:

| | Per cent |
|---|---|
| Cadmium | 20 to 40 |
| Zinc | 10 to 20 |
| Gold | Balance |

Other ingredients may be present in small proportions. A small quantity of lithium is of advantage, for example, in improving the fluidity of the solder. Small percentages of other elements which may improve the fluidity or strength or aid in reducing the melting point, are silver, copper, nickel, manganese, silicon and palladium, which may be present in small proportions. Phosphorous should not be included where the brazing alloy is used for steel since phosphorous promotes embrittlement of the steel and will produce a very weak bond.

One suitable brazing alloy, according to the present invention, has the following composition:

| | Per cent |
|---|---|
| Cadmium | 30 |
| Zinc | 15 |
| Gold | Balance |

While specific embodiments of the invention have been described, it is intended to cover the invention broadly within the spirit and scope of the appended claims.

What is claimed is:

1. A gold base brazing solder formed of 20 to 40% cadmium, 10 to 20% zinc and the balance substantially all gold.

2. A gold solder composed of 30% cadmium, 15% zinc and the balance gold.

FRANZ R. HENSEL.